US007051211B1

(12) United States Patent
Matyas, Jr. et al.

(10) Patent No.: US 7,051,211 B1
(45) Date of Patent: May 23, 2006

(54) SECURE SOFTWARE DISTRIBUTION AND INSTALLATION

(75) Inventors: Stephen Michael Matyas, Jr., Manassas, VA (US); Mohammad Peyravian, Morrisville, NC (US); Allen Leonid Roginsky, Durham, NC (US); Nevenko Zunic, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1001 days.

(21) Appl. No.: 09/642,685

(22) Filed: Aug. 21, 2000

(51) Int. Cl.
*G06F 11/30* (2006.01)
*G06F 12/14* (2006.01)
*H04L 9/32* (2006.01)

(52) U.S. Cl. .................. 713/187; 713/198; 713/200; 713/201; 380/201; 380/277; 380/286; 705/51; 705/56; 705/57; 705/59; 717/174; 717/176; 717/177; 717/178

(58) Field of Classification Search ............... 713/187, 713/200, 201, 190, 193; 380/201, 277, 286; 705/56, 57, 59, 51; 717/174, 176–178
See application file for complete search history.

(56) References Cited

U.S. PATENT DOCUMENTS

| 4,471,163 | A |   | 9/1984  | Donald et al. ......... 178/22.08 |
| 4,525,599 | A |   | 6/1985  | Curran et al. ......... 178/22.08 |
| 4,593,353 | A |   | 6/1986  | Pickholtz |
| 4,634,807 | A |   | 1/1987  | Chorley et al. ........ 178/22.08 |
| 4,757,534 | A |   | 7/1988  | Matyas et al. ............. 380/25 |
| 4,817,140 | A | * | 3/1989  | Chandra et al. ............ 705/55 |
| 5,024,495 | A |   | 6/1991  | Anderson ................. 350/3.7 |
| 5,267,311 | A |   | 11/1993 | Bakhoum ................... 380/4 |
| 5,287,407 | A |   | 2/1994  | Holmes ..................... 380/4 |
| 5,337,357 | A | * | 8/1994  | Chou et al. ................ 705/56 |
| 5,390,297 | A |   | 2/1995  | Barber et al. |
| 5,416,840 | A | * | 5/1995  | Cane et al. ................ 705/52 |
| 5,666,411 | A | * | 9/1997  | McCarty .................... 705/51 |
| 5,757,907 | A |   | 5/1998  | Cooper et al. ............... 380/4 |
| 5,870,726 | A |   | 2/1999  | Lorphelin ................ 705/400 |
| 5,915,019 | A |   | 6/1999  | Ginter et al. ................ 380/4 |
| 5,915,025 | A |   | 6/1999  | Taguchi et al. ............. 380/44 |

(Continued)

OTHER PUBLICATIONS

Schneier, Bruce, *Applied Cryptography: Protocols, Algorithms, and Source Code in C*, Chapter 14, (Dec. 1995).

(Continued)

*Primary Examiner*—Kim Vu
*Assistant Examiner*—Beemnet W. Dada
(74) *Attorney, Agent, or Firm*—Myers Bigel Sibley & Sajovec

(57) ABSTRACT

Methods, systems and computer program products are provide for controlling access to software is provided by the software to be controlled being divided into a first encrypted portion and a second unencrypted portion. The second unencrypted portion has access to, and may even incorporate, a first secret value and a software identification associated with a copy of the software. The first encrypted portion is encrypted with a first key value which is based on the first secret value and a second secret value. The second secret value is obtained and the first key value generated from the obtained second secret value and the first secret value. The first encrypted portion of the software may then be decrypted with the first key value. The software may be installed on a data processing system utilizing the decrypted first encrypted portion of the software.

39 Claims, 6 Drawing Sheets

U.S. PATENT DOCUMENTS

| | | | | |
|---|---|---|---|---|
| 5,920,630 A | * | 7/1999 | Wertheimer et al. | 380/286 |
| 5,974,141 A | * | 10/1999 | Saito | 705/52 |
| 6,000,030 A | * | 12/1999 | Steinberg et al. | 713/200 |
| 6,002,772 A | * | 12/1999 | Saito | 705/58 |
| 6,044,469 A | | 3/2000 | Horstmann | 713/201 |
| 6,226,747 B1 | * | 5/2001 | Larsson et al. | 713/200 |
| 6,408,390 B1 | * | 6/2002 | Saito | 713/193 |
| 6,483,921 B1 | * | 11/2002 | Harkins | 380/286 |
| 6,744,894 B1 | * | 6/2004 | Saito | 380/277 |

OTHER PUBLICATIONS

Manezes, Alfred J., et al., *Security of RSA, Handbook of Applied Cryptography*, Chapters 7 and 15 (1997).

Federal Information Processing Standards Publication 46-2, Data Encryption Standard (DES), Dec. 30, 1993.

Federal Information Processing Standards Publication 46-3, Data Encryption Standard (DES), Oct. 25, 1999.

* cited by examiner

SECURE SOFTWARE DISTRIBUTION AND INSTALLATION

FIELD OF THE INVENTION

The present invention relates to data processing systems and more particularly to the control of the installation of software on data processing systems.

BACKGROUND OF THE INVENTION

It is common for a company or an organization that writes software programs to sell copies of these software programs either on disks or over the Internet. Unfortunately, it is not easy to safeguard the software programs from unauthorized installation. If a program is delivered to customers unprotected, it may be obtained and installed by others, thereby denying the software development company an opportunity to collect payments from all users.

Various methods can be employed to prevent an unauthorized use, or, as it is often called, "pirated" use of computer software. These methods vary in their strength. Often the choice of the protection methodology depends on the assumptions on how sophisticated and skilled the potential attackers are. For example, one potential attacker may be the average buyer and user of personal or business software. He or she is typically knowledgeable about the most common operations involving files, so copying a software program may be within the realm of the user's capabilities. On the other hand, this average user is typically not skillful enough to explore and modify the inside of the executable version of a program or to find values and commands that direct the execution of various portions of the code of the program.

A second example of a potential attacker is a sophisticated "hacker" who can monitor a line or other connection to a data processing system and can read and intercept information flowing unprotected over a network, such as the Internet. These attackers are also, typically, skillful programmers who can analyze the software, locate data of interest to them and also write and execute programs, even the most complicated ones. The only thing that such an attacker may lack is the physical possession of a disk, if the distributed software was located on a disk when it was sold. Or, in some cases, these attackers may find it impossible to properly identify themselves to a server since the identification data may contain the serial number of a computing device they are using.

With these two types of potential attackers in mind, certain solutions to such a problem may provide adequate control but may difficult or expensive to implement. For example, one solution might be to use public key cryptography. Any of the well-known public key algorithms, such as the discrete logarithm (DL) problem in the multiplicative group of elements of a finite field, the RSA method, or a DL problem in a group of points on an appropriate elliptic curve, can be used. In a public key encryption procedure each user has two keys. One key is public and, as its name indicates, is published, so it is available to anyone. The other key is called private and is known to the user (i.e., the key owner) only. Hence, when a software company gets a request from a user, for example, over the Internet, to deliver a particular piece of software, it can, upon verifying the user's credentials, encrypt the program with the user's public key. Since, typically, only this authorized user is in possession of the private key, only the authorized user can decrypt the software and install it on his or her computer.

While the public key cryptography solution may provide software control, such a solution typically requires the existence of sophisticated public key infrastructure (PKI) and the presence of an entity called the Certification Authority (CA) which will certify each user's public key. Thus, this solution may be an expensive solution. The average person buying software on a disk or over the Internet, does not typically have a public/private key pair. The cost of protecting software would be prohibitively high and, therefore, the overall cost of the software may not be competitive. See Schneier, B., "*Applied Cryptography*," 2nd edition, John Wiley & Sons Inc, 1996, for a thorough description of issues related to public key cryptography: the algorithms, their strengths, performance parameters, their advantages and disadvantages.

Yet another solution would be to use a symmetric key algorithm, such as DES or the Triple DES as described in Applied Cryptography, and Menezes, A. J., van Oorschot, P. C., and Vanstone, S. A., "*Handbook of Applied Cryptography*," CRC Press, 1997. In this case, the encryption is performed much faster, but difficulties and expenses may arise with the distribution of these symmetric keys.

In addition to the systems described above, several patents have addressed the issue of software control. For example, U.S. Pat. No. 5,915,025 entitled "DATA PROCESSING APPARATUS WITH SOFTWARE PROTECTING FUNCTIONS," describes a data processing apparatus capable of enhancing the level of encryption security. Upon receiving target data to be encrypted, an encryption key generation unit generates an encryption key in accordance with an attribute of the target data. Using this encryption key, an encryption unit encrypts the target data. The encrypted data is placed into a storage unit. When a request is made to process the encrypted data, a decryption key generation unit generates a decryption key in accordance with the attribute of the encrypted data. The procedures for encryption and decryption may be quite complicated and rely on the use of public key encryption methods such as RSA.

Similarly, U.S. Pat. No. 5,757,907, entitled "METHOD AND APPARATUS FOR ENABLING TRIAL PERIOD USE OF SOFTWARE PRODUCTS: METHOD AND APPARATUS FOR GENERATING A MACHINE-DEPENDENT IDENTIFICATION," addressed the problem of protecting distributed software, and describes how to load the software onto a Compact Disk-Read Only Memory (CD-ROM).

U.S. Pat. No. 6,044,469, entitled "SOFTWARE PUBLISHER OR DISTRIBUTOR CONFIGURABLE SOFTWARE SECURITY MECHANISM," addresses the problem of how to protect software sent to publishers. As described in the '469 patent, additional code, called "the Protector code," is added to the software product. This code is executed according to the selected protection options.

A mechanism for limiting the number of licenses for a given software copy is described in U.S. Pat. No. 5,390,297, entitled "SYSTEM FOR CONTROLLING THE NUMBER OF CONCURRENT COPIES OF A PROGRAM IN A NETWORK BASED ON THE NUMBER OF AVAILABLE LICENSES." The '297 patent describes a system for limiting the number of nodes in a given network that can share the licensed software. The '297 patent also describes mechanisms for preventing a program from running on a computer if the key associated with that computer does not contain an available license for that program.

In U.S. Pat. No. 5,915,019, entitled "SYSTEMS AND METHODS FOR SECURE TRANSACTION MANAGE- MENT AND ELECTRONIC RIGHTS PROTECTION," various aspects of software protection are described. The systems described in the '019 patent utilize computers equipped in a certain way to ensure that information is accessed and used only in authorized ways. The '019 patent describes various methods of maintaining the integrity, availability, and the confidentiality of data.

Yet another method for software protection is described in the U.S. Pat. No. 5,666,411, entitled "SYSTEM FOR COMPUTER SOFTWARE PROTECTION." Software protected under the system in the '411 patent is described as executing on computer systems which incorporate a microprocessor capable of deciphering certain instructions in real time. In the described system, program files are first enciphered with the help of a distribution cipher key. Prior to first use of software, program files are customized on the user's computer system. This customization procedure re-enciphers the programs, so that they are enciphered under a second cipher key. Customized programs are not described as executing on a computer system other than one constructed with a processor chip that incorporates a crypto microprocessor. The crypto microprocessor is capable of performing this re-encipherment, and of executing both enciphered and unenciphered programs. The security and the efficiency of the system proposed in the '411 patent may depend largely on the properties of the processor chip.

In U.S. Pat. No. 4,757,534, entitled "CODE PROTECTION USING CRYPTOGRAPHY", a method is described where the user obtains a secret key directly from a vendor.

In U.S. Pat. No. 4,634,807, entitled "SOFTWARE PROTECTION DEVICE", the software is encrypted with DES, and the DES key is encrypted using the public key encryption mechanism. This software protection mechanism generally uses additional hardware placed in the client computer for the purposes of software protection only.

Yet another approach suitable for software distribution within a defined network of computers can be found in U.S. Pat. No. 5,287,407, entitled "COMPUTER SOFTWARE PROTECTION." A master copy of a software file has within it a predetermined block of data. When a copy of the file is made, that block of data within the copied file is located and overwritten with data identifying the copied file. Upon finding an unauthorized copy, the data identifying the copy can trace the unauthorized instance of software.

U.S. Pat. No. 4,593,353, entitled "SOFTWARE PROTECTION METHOD AND APPARATUS" describes a system where two authorization codes and an existence of a hardware module containing a pseudorandom number generator unique to the authorized system are utilized. The value generated by the number generator, which is a function of the key and of the particular pseudorandom generator algorithm, is compared with the second authorization code in direct or encrypted form. Depending upon the results of this comparison, a system may generate a signal that allows the installation of a piece of software.

In U.S. Pat. No. 4,471,163, "SOFTWARE PROTECTION SYSTEM", a protection system is described that controls the operation of a computer by locking the interfaces with this computer and by authorizing the operation in response only when there exists a particular relationship between a number in the program, a number in the lock, and a third number, a "key", supplied to the lock and which bears a selected relation to both the program number and lock number. In the described system, there exists the need to distribute these keys. Also, it appears that only the same key will re-open the lock after the first instance of the software module is installed.

Other patents relating to the software protection problem include, for example, those which introduce smart cards (U.S. Pat. No. 5,870,726), other special physical devices that prevent users from unauthorized copying of software (U.S. Pat. Nos. 5,267,311 and 4,525,599), by utilizing optical effects (U.S. Pat. No. 5,024,495) or by altering the I/O procedure.

SUMMARY OF THE INVENTION

Embodiments of the present invention include methods, systems and computer program products which provide for the control of the installation of software on data processing systems. In particular embodiments, an installation server is provided. The installation server has access to first and second secret values associated with a copy of the software for installation. An unencrypted installation client is also provided where the installation client incorporates the first secret value. An encrypted portion of the software is also provided. The encrypted portion of the software is encrypted with a first key value derived from the first and second secret values. The unencrypted installation client is configured to receive the second secret value from the installation server, to generate the first key value, to decrypt the encrypted portion of the software and to install the software.

In further embodiments of the present invention, the installation client is further configured to generate a second key value from the first key value and the first secret value, encrypt the decrypted portion of the software with the second key value and store the portion of the software encrypted with the second key value. The installation server may also be configured to generate the first key value and store the first key value as a subsequent second secret value associated with the copy of the software.

In such embodiments, the installation server may be further configured to retain a copy of an initial second secret value associated with the copy of the software and to selectively provide the initial second secret value to the installation client.

If the installation server maintains a copy of an original second secret value associated with a first key value utilized to encrypt an initial copy of the software, the installation server may also be configured to control the number of installations allowed for the copy of the software based on a maximum number of installations and a maximum number of times that the original second secret value may be sent to the installation client. In particular embodiments, the installation server may be configured to track the number of times that the copy of the software has been installed and the number of times that the original second secret value is sent to the installation client. The installation server may then reject a request for installation of the copy of the software if the installation results in either the number of times that the copy of the software has been installed exceeding the maximum number of software installations or the number of times that the original second secret value is sent to the installation client exceeds the maximum number of times that the original second secret value may be sent to the installation client.

In still further embodiments of the present invention, the installation client may be configured to decrypt the encrypted portion of the software and encrypt the portion of the software with the second key value without persistently storing the decrypted portion of the software, the second secret value, the first key value or the second key value.

The installation client may also replace the encrypted portion of the software with the portion of the software encrypted with the second key value. In further embodiments, the encrypted portion of the software may include a plurality of encrypted blocks. The installation client may sequentially decrypt the plurality of encrypted blocks with the first key value and sequentially encrypt and store the decrypted plurality of encrypted blocks with the second key value. However, a next of the plurality of encrypted blocks may be decrypted only after a previous of the plurality of encrypted blocks is encrypted with the second key value and stored.

In still further embodiments of the present invention, the installation server may be configured to receive a request for installation of the copy of the software from the installation client and provide the second secret value to the installation client in response to the request for installation of the copy of the software. The installation server may also determine if the requested installation is authorized and provide the second secret value to the installation client if the requested installation is authorized.

In particular embodiments of the present invention, a network interconnects the installation server and the installation client. The network may be the Internet.

In further embodiments of the present invention, the installation client is configured to copy at least the encrypted portion of the software from a read only storage device to a writeable storage device and to store the portion of the software encrypted with the second key value so as to overwrite the encrypted portion of the software stored on the writeable storage device.

In other embodiments of the present invention, controlling access to software is provided by dividing the software to be controlled into a first encrypted portion and a second unencrypted portion. The second unencrypted portion has access to, and may even incorporate, a first secret value and a software identification associated with a copy of the software. The first encrypted portion is encrypted with a first key value which is based on the first secret value and a second secret value. The second secret value is obtained and the first key value generated from the obtained second secret value and the first secret value. The first encrypted portion of the software may then be decrypted with the first key value. The software may be installed on a data processing system utilizing the decrypted first encrypted portion of the software.

In further embodiments, a second key value is generated from the first key value and the first secret value. The decrypted first encrypted portion of the software is then encrypted with the second key value and stored. The re-encrypted portion of the software may be stored by overwriting a stored copy of the first encrypted portion of the software encrypted with the first key value.

In still further embodiments of the present invention, the second secret value is obtained by requesting the second secret value from a network server and receiving the second secret value from the network server in response to the request for the second secret value. The second secret value may be requested by transmitting a request for the second secret value containing the identification of the copy of the software.

In particular embodiments, user information is obtained and provide with the request for the second secret value. Such user information may include, for example, identification of a data processing system on which the software is to be installed or identification of a user associated with the copy of the software.

In additional embodiments of the present invention, it may be determined if the request for the second secret value is for an authorized installation of the copy of the software. The second secret value may be sent only if the request is for an authorized installation of the copy of the software.

The determination of whether the request is for an authorized installation of the software may be based on, for example, the identification of the copy of the software, an identification of a user of the software, an identification of a data processing system on which the software is to be installed, an authorized number of installations for the copy of the software and/or a number of previous installations of the copy of the software. Furthermore, the number of times that the copy of the software has been installed may be tracked and the determination of whether the request is for an authorized installation may be provided by determining if the number of times that the copy of the software has been installed exceeds a maximum number of times that the software is authorized for installation.

In further embodiments of the present invention, the first key value is generated based on the first and second secret values at the network server and the first key value associated with the copy of the software as an updated second secret value to be provided in response to a subsequent request for the second secret value.

In yet additional embodiments of the present invention, the first encrypted portion of the software is copied from a read only media to a writeable storage media. A second key value is generated from the first key value and the first secret value. The decrypted first encrypted portion of the software is encrypted with the second key value and stored on the writeable storage media. Furthermore, a copy of the second secret value may be maintained as an initial second secret value. The updated second secret value and the initial second secret value may also be provided in response to a request for the second secret value.

In further embodiments of the present invention it may be determined if a request for installation is a request to resynchronize to the secret values utilized to generate the first key value. If so, the initial second secret value may be provided in response to the request. Furthermore, the number of times that the initial second secret value has been requested and/or provided may be tracked. In such a case, the determination of whether the request is for an authorized installation may include determining if the number of times that the second secret value has been provided exceeds a maximum number of times that the second secret value is authorized to be provided.

In yet further embodiments of the present invention, the first encrypted portion of the software may be encrypted as a plurality of encrypted blocks. The first encrypted portion of the software may then be decrypted by decrypting an encrypted block of the plurality of encrypted blocks with the first key value. The decrypted first encrypted portion of the software may be re-encrypted by encrypting the decrypted block with the second key value. The first encrypted portion of the software encrypted with the second key value may be stored by storing the block encrypted with the second key value and a block of the plurality of encrypted blocks may be decrypted, encrypted and stored before a next block of the plurality of blocks is decrypted, encrypted and stored.

While the invention has been described above primarily with respect to the method aspects of the invention, both systems and/or computer program products are also provided.

DETAILED DESCRIPTION OF PREFERRED EMBODIMENTS

Figure 1:
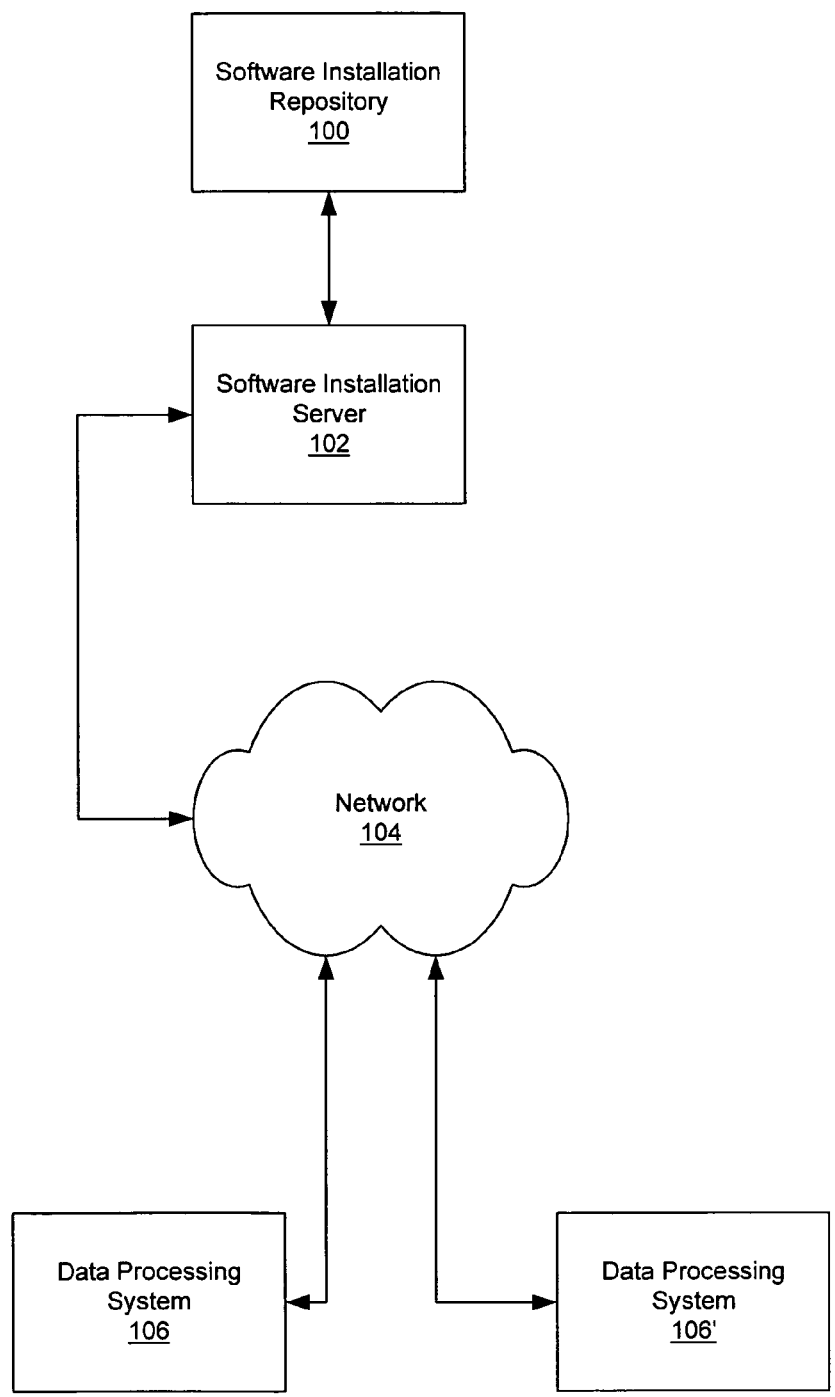
FIG. 1 is a block diagram of a software installation system according to embodiments of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java™, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

As is described in more detail below, the present invention may provide for the control of software by controlling the installation of the software. In certain embodiments of the present invention, the software may be divided into encrypted and unencrypted portions. The software installation may not be completed on the user's data processing system without decrypted the encrypted portion of the software. The key "K" to decrypt the encrypted portion of the software is a function of two parameters, "A" and "S". The entity controlling the software knows both parameters and the user does not. Thus, the unencrypted portion of the software may contain or have access to the secret value A. The unencrypted portion may be executed to obtain a secret value "S" from, for example, a network server. The values S and A are utilized to derive the encryption key "K" which may be used to decrypt the encrypted portion of the software. The decrypted portion of the software may also be re-encrypted with an encryption key "K_new" which may be derived from the encryption key K and the secret value A. Various embodiments of the present invention will now be described with reference to FIGS. 1 through 6.

Referring now to FIG. 1, a system for software control according to embodiments of the present invention is illustrated. As seen in FIG. 1, a software installation repository 100 may be accessible to a software installation server 102. The software installation repository 100 may contain product identification information (ID), S values and A values associated with particular copies of the software to be controlled. Furthermore, the software installation repository 100 may contain rules or policies for allowing installation of the software. In addition to storing the triplet (ID, S, A), the software installation repository may also store information about the user (e.g. the software purchaser) or user's data processing system (collectively referred to as "user information") which may be further utilized to control installation of the software.

The software installation server 102 may have access to a network 104. The network 104 may be an intranet, an extranet, a virtual private network, the Internet, a wireless network, a direct dial connection or even a "sneaker" network where information is transmitted from processing system to processing system utilizing a removable storage media. Whatever the method of communication, the network 104 serves to provide communication between the software installation server 102 and the target data processing systems 106 and 106' for installation of the controlled software.

As briefly described above, the software code which is controlled includes two parts and may be obtained by the data processing systems 106 and/or 106' as a download or from a removable storage media. As described above, one part of the software is in an unencrypted format and is executed first. The second part is encrypted and, typically, can not be installed on the user's computer without being decrypted first. The value of the key (K) used to encrypt this software code may be defined as described below and is a function of the two parameters, S and A.

The unencrypted part of the software contains a product identification information (ID), as well as the secret value S, which may be stored somewhere in the software code. While the experienced hacker might possibly be capable of analyzing the content of the software code and figuring out where the secret value S is placed and what its value is, typically, the average user who purchases the software will be unable to determine either the value of S or even its location in the code. As described above, with each instance of sold software there may also be associated a secret value A, which initially is not going to be available to the user and will not be in the software code provided to the user. The software installation server 102, operated on behalf of the software provider, may access the software installation repository 100 and, thereby, may possess the knowledge of every unit of software that was generated (and, possibly, sold.) Each unit is identified by the unique aforementioned product ID. The software installation server 102 may also access the software installation repository 100 to obtain the secret value A which is not available to the user.

When the user loads the received software code into the target data processing system 106 and/or 106', the target data processing system 106 and/or 106' makes a connection through the network 104, for example, through the Internet, to the software installation server 102. The target data processing system 106 and/or 106' also starts the execution of the unencrypted portion of the software located in the code.

The unencrypted portion of the software may obtain user information by, for example, prompting the user to enter user information parameters. This may be the only input that will be required from the user and may follow the practice normally used when software packages are installed. Accordingly, as techniques for obtaining user information are known to those of skill in the art, they need not be described further herein.

The unencrypted portion of the software accepts the information provided by the user and requests authorization to install the software by sending the information, along with the product ID value to the software installation server 102. Optionally, the unencrypted portion of the software might also determine the unique identifier of the target data processing system 106 and/or 106' or other such parameters and send these further parameters to the software installation server 102. This may inform the software installation server 102 that an installation attempt is being made at a new target data processing system 106 and/or 106'. Depending upon its policy, which may be specified by the rules or policies of the software installation repository 100, the software installation server 102 may choose to count such attempts and/or to terminate the installation process at that time.

This feature may be helpful against attacks by an unsophisticated user who may share the software code with another person who has not paid for the software. It may also help to stifle efforts by a knowledgeable hacker who can provide the software installation server 102 with all required information, except that the software installation server 102 will know that the target data processing system 106 and/or 106' was different from one installation to the next.

When the software installation server 102 receives the message over the network 104, it will try to identify the instance of the product and verify that the user is the legitimate customer. As described above, The (ID, S) pair has a corresponding value A in the software installation repository 100 which the software installation server 102 may access to authorize the installation. Upon the successful verification of the user-supplied data, the software installation server 102 will send the secret value A in the clear to the target data processing system 106 and/or 106'. Note that the user does not need to be aware of this. The protocol may run between a client software installation application and a server software installation application without any human intervention.

Upon sending A, the software installation server 102 may assign a new value, A_new, in the software installation repository 100 to correspond to the (ID, S) pair. This value A_new may be equal to Hash (S, A). Suitable hash functions are described in *Applied Cryptography*, pp. 321 to 346.

The unencrypted portion of the software at the target data processing system 106 and/or 106' will receive A and compute the key K=Hash(S, A). This is the key that was used to encrypt the second portion of the software. Note that if the same hash function is utilized at the target data processing system 106 and/or 106' and the software installation server 102, K is equal to A_new and may be computed independently by the client and server systems.

The encrypted portion of the program will be decrypted at the target data processing system 106 and/or 106' using the newly-computed key K. The decrypted software will be referred to as "P" herein. The decrypted software P may be installed on the target data processing system 106 and/or 106' by the unencrypted portion of the software.

Software P will be re-encrypted with the new key K_new=Hash(S, K) and stored on a writable storage media at the target data processing system 106 and/or 106'. Such operations may be carried out without P, A or K being stored at the target data processing system 106 and/or 106'. Thus, theft of the unencrypted software may be difficult or impossible.

This installation cycle may be repeated with the newly re-encrypted and stored portion of the software. If a new request comes to the software installation server 102, it may, depending on its policies, authorize the installation of the new instance of this software. A subsequent installation can be performed without distributing a new copy of the software code. The previously installed software P has been re-encrypted with the new key K_new and the value of A_new, kept by the software installation server 102 in the software installation repository 100, will lead, upon the proper execution of the protocol, to the computation of K_new on the target data processing system 106 and/or 106' and to the successful installation of P. This process may continue indefinitely, however, typically the process will only continue until there are no more attempts to install the software code with this particular value of the secret S or until the software installation server 102 chooses to stop it, for example, either because the number of the installed instances has exceeded a certain threshold, because one of the users was using a programming device whose number was not accepted by the server, or for any other reason.

In particular embodiments of the present invention, the unencrypted portion of the software program on the target data processing system 106 and/or 106' establishes a connection with the software installation server 102 in order to receive the value A (or new value A_new in the case of subsequent installations). The value A is communicated from the software installation server 102 to the unencrypted portion of the program resident on the target data processing system 106 and/or 106', transparently to the user. Furthermore, it may be preferred that the target data processing system 106 and/or 106' receive the value A, or new value A_new, and provide the value to the unencrypted portion of the program resident on the target data processing system 106 and/or 106' without allowing the user to input the value of A. No such interface is provided for reasons of security. Even if the user were able to intercept the value A, or new value A_new, the user may have no means to input this value to the unencrypted portion of the program resident on the target data processing system 106 and/or 106'. That is, it may be preferred that there be no interface that allows the value A, or new value A_new, to be input except by way of the communications session established between the unencrypted portion of the program resident on the target data processing system 106 and/or 106' and the software installation server 102. In effect, such a lack of an interface may reduce the likelihood of an attack in which the user somehow inputs an old A value and repeatedly installs the same decrypted software P on the client machine.

While systems according to embodiments of the present invention are illustrated as having a separate software installation repository 100 and software installation server 102, as will be appreciated by those of skill in the art, such functions may be integrated into a single data processing system or may be distributed across multiple data processing systems. Also, the functions of the software installation repository 100 may be integrated with the software installation server 102. Furthermore, multiple software installation servers 102 may access a single software installation repository 100 or multiple software installation repositories 100 may be accessed by a single software installation server 102. Thus, the present invention should not be construed as limited to the particular configuration illustrated in FIG. 1 but may be utilized with any configuration suitable for carrying out the operations described herein.

Figure 2:
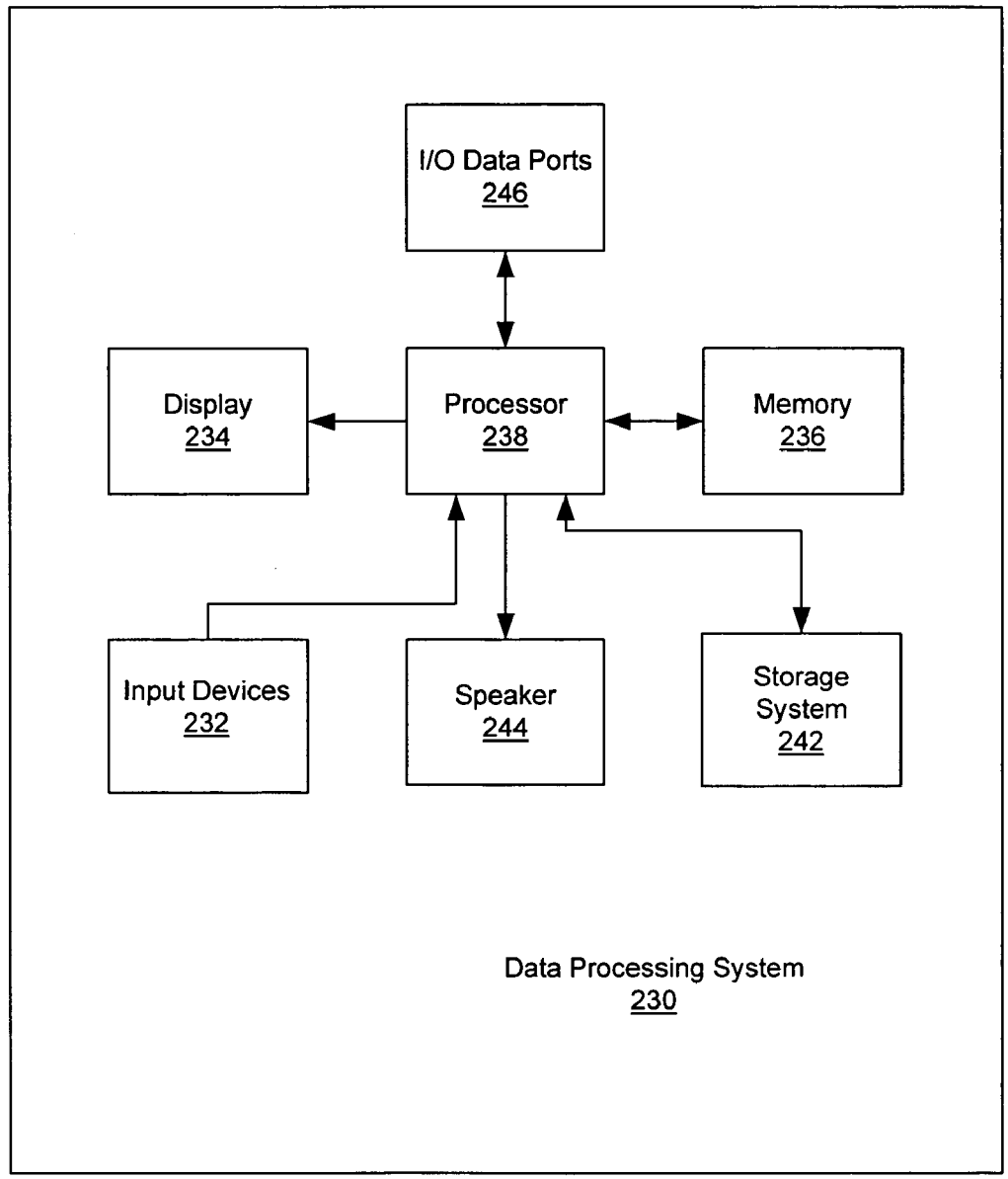
FIG. 2 is a block diagram of data processing systems according to embodiments of the present invention.

Referring now to FIG. 2, an exemplary embodiment of a data processing system 230 suitable for use as either a software installation repository 100, a software installation server 102 or a target data processing system 106 and/or 106' in accordance with embodiments of the present invention is illustrated and may include input device(s) 232 such as a keyboard or keypad, a display 234, and a memory 236 that communicate with a processor 238. The data processing system 230 may further include a storage system 242, a speaker 244 and an I/O data port(s) 246 that also communicate with the processor 238. The storage system 242 may include removable and/or fixed media such as floppy disks, ZIP drives, hard disks or the like as well as virtual storage such as a RAMDISK. The I/O data port 246 can be used to transfer information between the data processing system 230 and another computer system or a network (e.g., the Internet). Such data processing systems may include, for example, personal computers, laptop computers, mainframe computers, pervasive computing devices such as personal digital assistants, smartphones or the like, or even embedded processing systems. The components of a particular data processing system may be conventional or custom components, such as those used in many conventional computing devices, which may be configured to operate as described herein.

Figure 3:
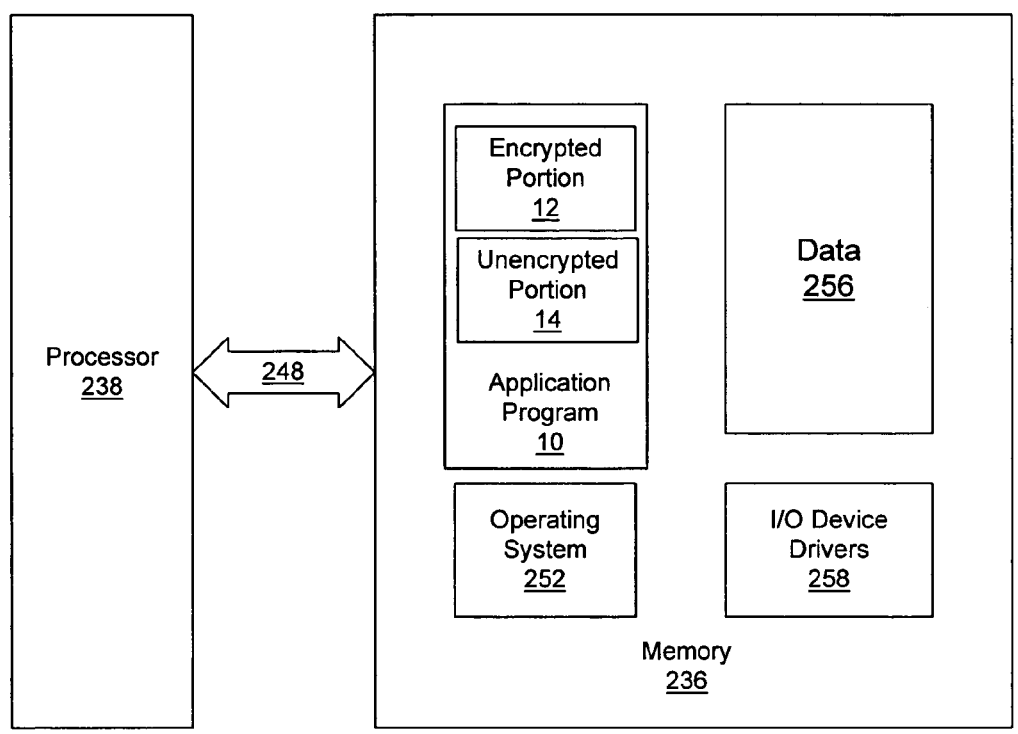
FIG. 3 is a more detailed block diagram of data processing systems according to embodiments of the present invention.

FIG. 3 is a block diagram of data processing systems that illustrates systems, methods, and computer program products in accordance with embodiments of the present invention. The processor 238 communicates with the memory 236 via an address/data bus 248. The processor 238 can be a commercially available or custom microprocessor. The memory 236 is representative of the overall hierarchy of memory devices containing the software and data used to implement the functionality of the data processing system 230. The memory 236 can include, but is not limited to, the following types of devices: cache, ROM, PROM, EPROM, EEPROM, flash memory, SRAM, and DRAM.

As shown in FIG. 3, the memory 236 may contain several categories of software and data used in the data processing system 230: the operating system 252; the application program 10; the input/output (I/O) device drivers 258; and the data 256. As will be appreciated by those of skill in the art, the operating system 252 may be any operating system suitable for use with a data processing system, such as OS/2, AIX or OS/390 from International Business Machines Corporation, Armonk, N.Y., WindowsCE, WindowsNT, Windows95, Windows98 or Windows2000 from Microsoft Corporation, Redmond, Wash., PalmOS from Palm, Inc., MacOS from Apple Computer, UNIX or Linux, proprietary operating systems or dedicated operating systems, for example, for embedded data processing systems.

The I/O device drivers 258 typically include software routines accessed through the operating system 252 by the application program 10 to communicate with devices such as the input devices 232, the display 234, the speaker 244, the storage system 242, the I/O data port(s) 246, and certain memory 236 components. The application program 10 is illustrative of the programs that implement the various features of the data processing system 230 and may represent any application which may perform a file write operation. Finally, the data 256 represents the static and dynamic data used by the application program 10, operating system 252, I/O device drivers 258, and other software programs that may reside in the memory 236.

As is further seen in FIG. 3, for target data processing systems, the application program 10 preferably includes an encrypted portion 12 and an unencrypted portion 14. Such encrypted portions 12 and unencrypted portions 14 may function as described herein for providing controlled installation of software such as the application program 10. For server data processing systems, the application program 10 may, instead, include a software installation server module and a software installation repository module (not shown).

While the present invention is illustrated, for example, with reference to an encrypted portion 12 and an unencrypted portion 14 of an application program 10 which carries out the operations for software installation, as will be appreciated by those of skill in the art, these functions may also be incorporated into for example, the operating system 252. Thus, the present invention should not be construed as limited to the configuration of FIG. 3 but is intended to encompass any configuration capable of carrying out the operations described herein.

Figure 4:
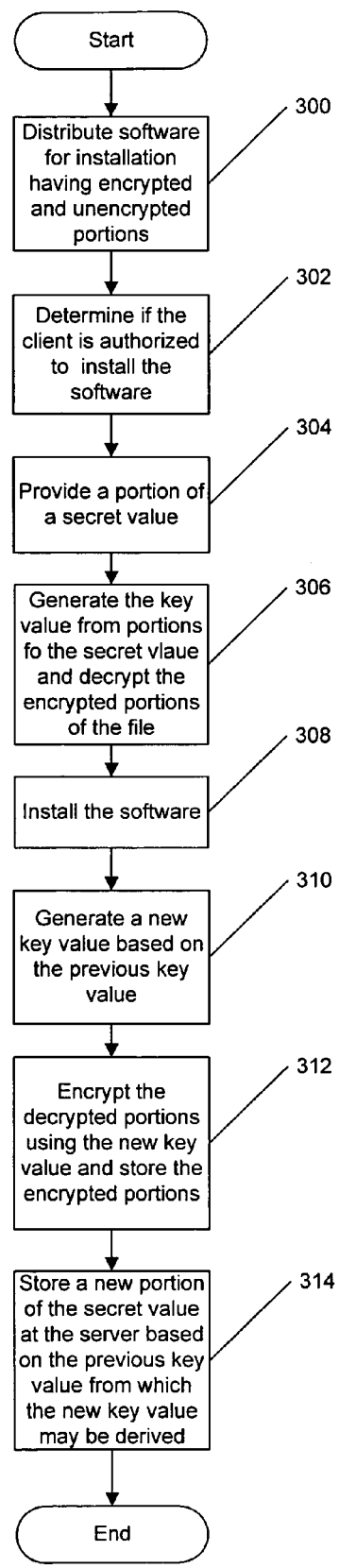
FIG. 4 is a flowchart illustrating operations according to embodiments of the present invention.

FIG. 4 illustrates operations of data processing systems for carrying out embodiments of the present invention. For example, the data processing systems illustrated in FIGS. 2 and 3 may be utilized for carrying out operations according to embodiments of the present invention. As seen in FIG. 4, the software to be controlled is divided into an unencrypted portion and an encrypted portion and distributed to end users for installation (block 300). The software may be distributed through any suitable distribution channel, including downloading the software from a server via a network or through direct connection or distribution on removable storage media such as a CD-ROM, ZIP disk, floppy disk, flash memory such as utilized in digital cameras or other such suitable portable storage media.

However, the software is distributed, it is also determined if a user is authorized to install the software (block 302). This determination may be made at a server, such as the software installation server (block 102). Thus, the server may act as a gate keeper which controls the installation of copies of the software on an individual basis. This authorization may be provided at the time of installation by, for example, the software connecting to the server over a network to receive authorization for an installation or the authorization may be given in advance by, for example, distributing with the software a pre-authorized number of installations.

In any event, if the installation is authorized, a portion of a secret value from which the key utilized to encrypt the encrypted portion of the software may be determined and provided to the unencrypted portion of the software to allow the unencrypted portion of the software to decrypt the encrypted portion of the software (block 304). This first provided secret portion is utilized with a second secret portion which is provided with the unencrypted portion of the software to generate the key to decrypt the encrypted portion of the software and the encrypted portion of the software is decrypted (block 306). As described herein, such a key may be generated by hashing the first and second secret portions. The software may then be installed utilizing the decrypted portion of the software (block 308). Such installation procedure is preferably carried out without persistently storing either the decrypted portion of the software or the first secret portion such that copies of such items are not available for attack after the installation process is completed. As used herein, persistently storing refers to storing an item such that it is retrievable after the installation process has completed. Thus, for example, storing an item on disk may be considered "persistent" or storing an item in flash memory may also be considered persistent.

In addition to installing the software, optionally, the encrypted portion of the software may be re-encrypted with a new key to provide further security against a subsequent installation by an attacker that had intercepted the first secret portion. Thus, as seen in block 310, a new key value is generated based on the previous key value. The decrypted portions of the software may then be encrypted utilizing the new key value and the re-encrypted portions of the software stored, preferably, by overwriting the old version (block 312). A new first secret portion is also stored remote from the target data processing system, such as at the server, which, when combined with the second secret portion, is capable of generating the new key value (block 314). This new first secret portion can be provided during a subsequent installation, for example, by the server, to allow the subsequent installation of the software. Thus, in such a system, the server may store both the first and second portions of the secret value so as to allow the generation of a key value at the server and, thereby allow the server to independently generate a new first secret portion. As such, the key values and the second secret portion need not be communicated between a copy of the software and the server which may reduce the likelihood of attacks based on these values.

Figure 5:
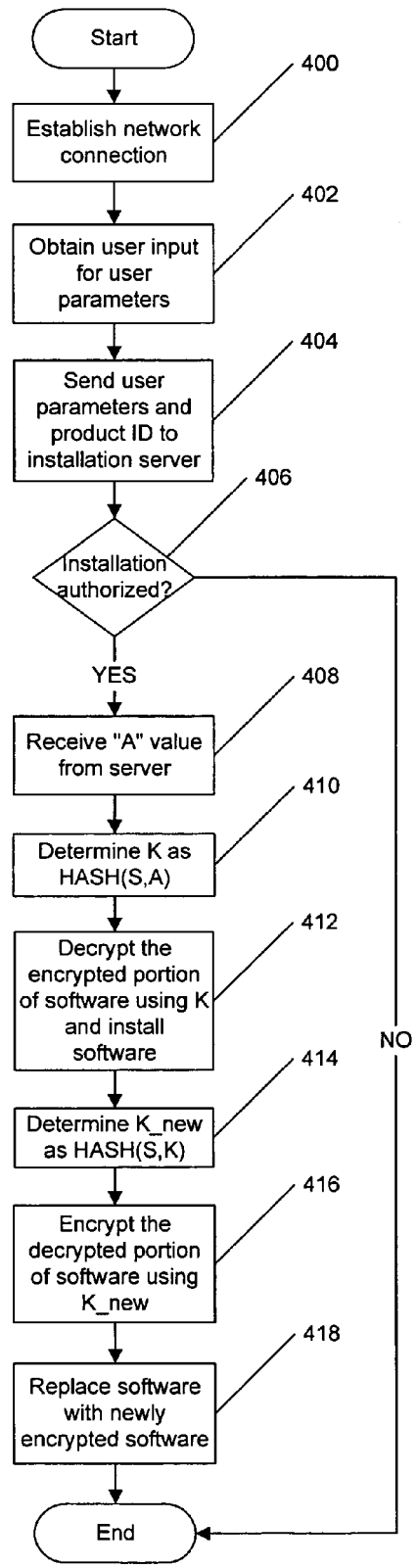
FIG. 5 is a flowchart illustrating operations of a software installation client according to embodiments of the present invention.

Particular embodiments of the present invention will now be described with reference to FIGS. 5 and 6 which are flowcharts of operations carried out by a client and a server. As seen in FIG. 5, upon execution of the unencrypted portion of the software, the installation client establishes a connection to the installation server (block 400). User input is obtained for the user parameters to be provided to the installation server (block 402). The user parameters and a product identification of the software product are provided to the installation server (block 404). If the installation is not authorized (block 406), then the operations may terminate. The determination of whether an installation is not authorized may be explicit, by, for example, the server returning a message rejecting the request or may be implicit, by, for example, the server not responding to the request and causing the client to timeout.

If the installation is authorized, then the client receives the A value from the server (block 408). The key value K is calculated by determining HASH (S,A) wherein S is a secret value contained in the client (block 410). The encrypted portion of the software is decrypted using K and the software is installed (block 412). A new key value K_new is then calculated by determining HASH (S,K) (block 414) and the decrypted portion of the software is encrypted utilizing the new K_new key value (block 416). The encrypted portion of the software may then be overwritten with the newly encrypted portion encrypted with K_new (block 418). Optionally, the installation client may notify the installation server of a successful installation and overwrite of the encrypted portion of the software by, for example, sending an acknowledge or other message to the server, so that the client and the server may remain synchronized.

Figure 6:
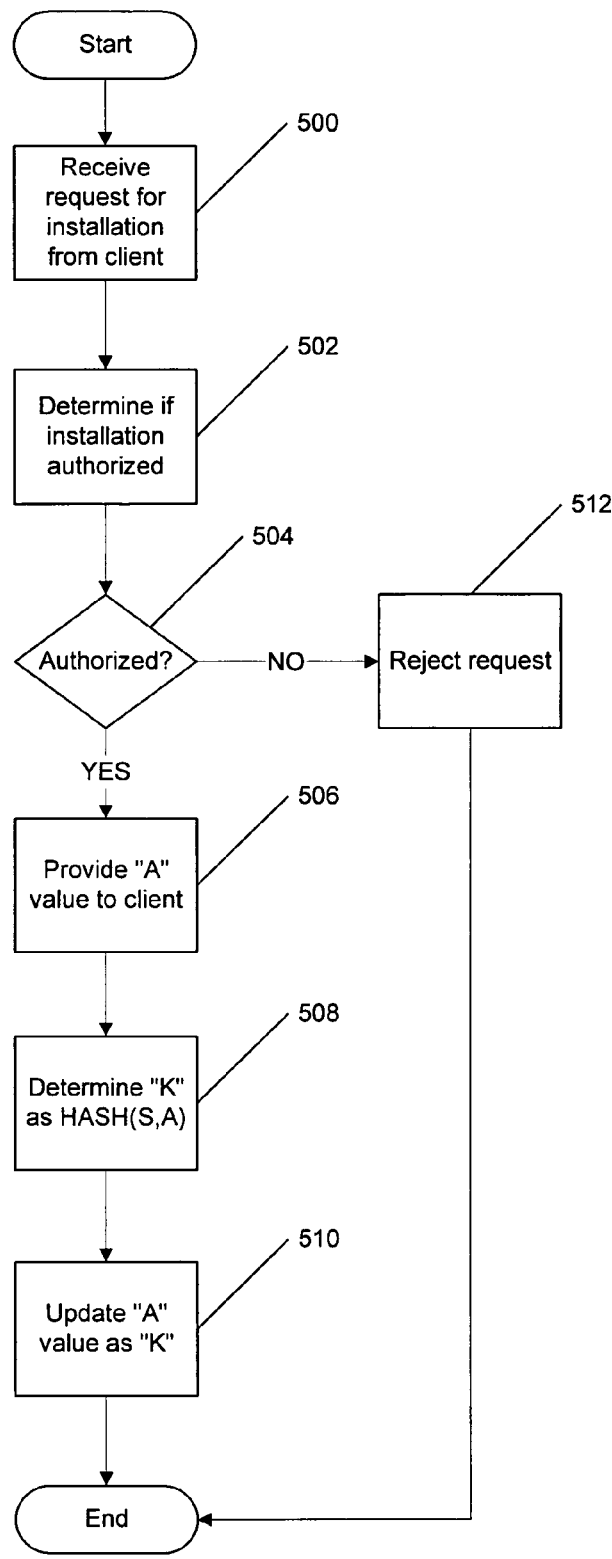
FIG. 6 is a flowchart illustrating operations of a software installation server according to embodiments of the present invention.

FIG. 6 illustrates operation of the installation server. As seen in FIG. 6, the installation server receives a request to install the software from a software installation client (block 500). The installation server may utilize information in the request to determine if the requested installation is authorized (block 502). Such a determination may be made based on rules or policies as described above. If the installation is not authorized (block 504), then the request is rejected (block 512). Such a request may be rejected by, for example, sending a message to the installation client indicating that the installation is rejected.

If the installation is authorized (block 504), then the A value is sent to the client (block 506). The installation server also determines the key value by determining K=7HASH (S,A) (block 508) and updates the A value with K (block 510). The update of the A value may involve overwriting the current A value or separately storing a new A value. Optionally, the installation server may delay storing K as a new A value until a confirmation or acknowledgment of the successful installation is received from the client.

In certain embodiments of the present invention, the software code may be received on a read-only storage medium. For example, the software code could be received on a Compact Disk (CD) and the user's client computer may have only a capability to read information stored on the CD but not write information on the CD. If the software code is received on a read-only storage medium, then it would not be possible to re-encrypt the decrypted portion of the software and write it back on the CD.

Therefore, in such embodiments of the present invention, the user's client computer may read the software code from the medium on which it is received and store it on a second medium, where the user's client computer has a capability to read and write information on that second medium (e.g., a file stored on a hard disk). If the software code is received on a medium such that the user's client computer can read and write information to that medium, then the user's client computer may have the option to leave the software code on the received medium or alternatively read software code from the medium and store it on a second read-write medium. By writing the software to a writable medium, the decrypted software P can be re-encrypted and written back onto the medium from which it was read.

The storage medium utilized by the user's client computer to store the received software code may be portable or non-portable. If the storage medium is portable, then the user can port the software code, which may include decrypted software P that has been re-encrypted under a new key, and that software code can be used at a different client computer available to the user. When the software code resides on a portable storage media, the procedure described above can also be used to decrypt the encrypted portion of the software code and install the decrypted software P on a different client computer.

An alternative mechanism for decrypting and installing the software code at a different client computer would be to port the storage medium on which the software code was originally received to a different client computer. However, in this case, the server must keep the original value of A, as well as the current value of A_new. In effect, the value of A allows the software code to be installed on any number of different client computers. However, the installation server may then need to maintain each A_new value for each different client computer on which the software code is installed. Moreover, the installation server may also keep track of the number of times the user is allowed to decrypt and install the software, which in this case may be the same as the total number of times the user has decrypted and installed the software on all the different client computers.

In further embodiments, the installation client may provide a kind of "failsafe" mechanism to ensure that the re-encrypted software is actually written back on the storage medium by the system. In such embodiments, the encrypted portion of the software is encrypted in a series of blocks. A first block of encrypted data is read from the storage medium and decrypted. The decrypted block is temporarily stored until the entire decrypted software P has been recovered. However, rather than waiting until all of P has been recovered and then re-encrypting P and storing the re-encrypted P back on the storage medium, the decrypted blocks are re-encrypted and written back on the storage medium incrementally. For example, before the second block of encrypted data is read from the storage medium and decrypted, the first decrypted block is re-encrypted and written back on the storage medium (overlying the previous first block of encrypted data). Then, optionally, the first block of re-encrypted data may be again read from the storage medium, decrypted under the new key and compared for equality with the decrypted first block which has been saved by the encryption software. If the two compared values are equal, only then will the encryption software read the second block of encrypted data and decrypt it. If the two compared values are not equal, the encryption software may abort and refuse to continue with the decryption and installation process.

A further circumstance which embodiments of the present invention may take into account is the possibility of a system crash. If the re-encrypted version of P is written on the storage medium, as described above, then the crash of the client's machine may result in the loss of synchronization between the server and the client. Hence the new A_new value that the server will send to the client the next time a request to install the software arrives, will not lead to the calculation of the correct decryption key.

To overcome this problem the original copy of the encrypted software may be kept by the client in a separate location where it can not be lost. For example, if this original copy was stored on the CD, then this CD is kept in addition to storing the re-encrypted software in a different storage medium.

The installation server will, in turn, keep the original A value, so the new synchronization is possible. If a system crash occurs on the client side, then the user can notify the vendor, either by making a phone call, through an e-mail message or by going to the vendor's Web site, or even by adding an appropriate notification to the next request to install the software, that the crash occurred and that the process needs to be re-started.

However, in such a system, there is a danger that the user will abuse this system and claim that their computer crashed. For example, if the user knows that this software can be installed 10 times, the software could be installed 9 times and then the user claim that there was a crash, obtain the original A value and then install the software 9 more times, and so on. To combat this attack the installation server may maintain the following values: A_original, A_current, M, N, M_max and N_max, where M_max is the number of times the original A value can be sent, M is the number of times it has been sent, N_max is the number of installations allowed and N is the number of installations so far. M_max, N_max should be greater than 0.

The server's logic will then be as follows:

```
Initialize: M=1, N=0, A_current = A_original = A
If a regular (not reporting a crash) request is received then
    N=N+1
    if N > N_max then Stop
    else Send A_current
        Set A_current = Hash(S, A_current)
    endif
endif
If a crash-reporting request is received then
    M=M+1
    (optionally) N=N+1
    if M > M_max or N > N_max then Stop
    else Send A_original
        Set A_current = Hash(S, A_original)
    endif
endif
```

The optional step above would allow the server to count the crash-induced installation towards the total. By tracking the number of successful installations and the number of crashes, the total number of installations may be controlled even if a user attempts to circumvent the system. Furthermore, if an uninstall operation is performed, the installation server could also be notified of a successful uninstall and the value for N adjusted accordingly. In such a manner, the total number of installed copies of the software could be controlled without unduly limiting the user in the event that the software is to be moved from on computer to another.

A further issue which may be addressed by embodiments of the present invention is the issue of privacy. A user may wish to stay anonymous, that is, they may buy a CD with an encrypted copy of software in a store and not be willing to disclose their identity to the vendor of this software. If this becomes a concern, embodiments of the invention may be provided which do not require the user to input information that would identify him or her to the vendor. While this may make it more difficult for the software provider to keep track of all users, the software copies may still be protected and the vendor can limit, as before, the number of times a particular copy of P has been installed based upon the product identification provided as part of the software.

In such embodiments, the software installation process may be even more straightforward. If the user buys the software on a CD they may insert the CD into a computer and the process will begin. The unencrypted portion of the program will read the Product ID information and send it to the installation server. From this point on, the operations may be carried out as described above.

The flowcharts and block diagrams of FIGS. 1 through 6 illustrate the architecture, functionality, and operation of possible implementations of systems, methods and computer program products for software control according to the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A system for controlling installation of software, the system comprising:
   an installation server, the installation server having access to first and second secret values associated with a copy of the software for installation;
   an unencrypted installation client, the installation client incorporating the first secret value; and
   an encrypted portion of the software, wherein the encrypted portion of the software is encrypted with a first key value derived from the first and second secret values;
   wherein the unencrypted installation client is configured to receive the second secret value from the installation server, to generate the first key value, to decrypt the encrypted portion of the software and to install the software; and
   wherein the installation client is further configured to generate a second key value from the first key value and the first secret value, encrypt the decrypted portion of the software with the second key value and store the portion of the software encrypted with the second key value.

2. A system according to claim 1, wherein the installation server is further configured to generate the first key value and store the first key value as a subsequent second secret value associated with the copy of the software.

3. A system according to claim 2, wherein the installation server is further configured to retain a copy of an initial second secret value associated with the copy of the software and to selectively provide the initial second secret value to the installation client.

4. A system according to claim 2, wherein the installation server is configured to maintain a copy of an original second secret value associated with a first key value utilized to encrypt an initial copy of the software and wherein the installation server is configured to control the number of installations allowed for the copy of the software based on a maximum number of installations and a maximum number of times that the original second secret value may be sent to the installation client.

5. A system according claim 4, wherein the installation server is configured to track the number of times that the copy of the software has been installed and the number of times that the original second secret value is sent to the installation client and wherein the installation server is further configured to reject a request for installation of the copy of the software if the installation results in at least one of the number of times that the copy of the software has been installed exceeding the maximum number of software installations and the number of times that the original second secret value is sent to the installation client exceeds the maximum number of times that the original second secret value may be sent to the installation client.

6. A system according to claim 1, wherein the installation client is configured to decrypt the encrypted portion of the software and encrypt the portion of the software with the second key value without persistently storing the decrypted portion of the software, the second secret value, the first key value or the second key value.

7. A system according to claim 1, wherein the installation client is further configured to replace the encrypted portion of the software with the portion of the software encrypted with the second key value.

8. A system according to claim 7, wherein the encrypted portion of the software comprises a plurality of encrypted blocks and wherein the installation client is further configured to sequentially decrypt ones of the plurality of encrypted blocks with the first key value and sequentially encrypt and store the decrypted plurality of encrypted blocks with the second key value, wherein a next of the plurality of encrypted blocks is decrypted after a previous of the plurality of encrypted blocks is encrypted with the second key value and stored.

9. A system according to claim 1, wherein the installation server is further configured to receive a request for installation of the copy of the software from the installation client and provide the second secret value to the installation client in response to the request for installation of the copy of the software.

10. A system according to claim 9, wherein the installation server is further configured to determine if the requested installation is authorized and provide the second secret value to the installation client if the requested installation is authorized.

11. A system according to claim 1, further comprising a network interconnecting the installation server and the installation client.

12. A system according to claim 11, wherein the network comprises the Internet.

13. A system according to claim 1, wherein the installation client is further configured to copy at least the encrypted portion of the software from a read only storage device to a writeable storage device and to store the portion of the software encrypted with the second key value so as to overwrite the encrypted portion of the software stored on the writeable storage device.

14. A method of controlling access to software by a data processing system, comprising:
   providing a copy of the software, the software being divided into a first encrypted portion and a second unencrypted portion, the second unencrypted portion having access to a first secret value and a software identification associated with the copy of the software and wherein the first encrypted portion is encrypted with a first key value which is based on the first secret value and a second secret value associated with the software identification of the copy of the software;

obtaining the second secret value;

generating the first key value from the obtained second secret value and the first secret value;

decrypting the first encrypted portion of the software utilizing the first key value;

generating a second key value from the first key value and the first secret value;

encrypting the decrypted first encrypted portion of the software with the second key value; and storing the first encrypted portion of the software encrypted with the second key value.

15. A method according to claim 14, further comprising installing the software on a data processing system utilizing the decrypted first encrypted portion of the software.

16. A method according to claim 14, wherein the step of storing the first encrypted portion comprises overwriting a stored copy of the first encrypted portion of the software encrypted with the first key value.

17. A method according to claim 14, wherein the step of obtaining the second secret value comprises the steps of:

requesting the second secret value from a network server; and receiving the second secret value from the network server in response to the request for the second secret value.

18. A method according to claim 17, wherein the step of requesting the second secret value from the network server comprises transmitting a request for the second secret value containing the identification of the copy of the software.

19. A method according to claim 18, further comprising the step of obtaining user information and wherein the request for the second secret value further contains the obtained user information.

20. A method according to claim 19, wherein the user information comprises at least one of identification of a data processing system on which the software is to be installed and identification of a user associated with the copy of the software.

21. A method according to claim 17, further comprising the steps of:

determining if the request for the second secret value is for an authorized installation of the copy of the software; and sending the second secret value only if the request is for an authorized installation of the copy of the software.

22. A method according to claim 21, wherein the determination of whether the request is for an authorized installation of the software is based on at least one of the identification of the copy of the software, an identification of a user of the software, an identification of a processing system on which the software is to be installed, an authorized number of installations for the copy of the software and a number of previous installations of the copy of the software.

23. A method according to claim 21, further comprising the step of tracking the number of times that the copy of the software has been installed; and wherein the determination of whether the request is for an authorized installation comprises the step of determining if the number of times that the copy of the software has been installed exceeds a maximum number of times that the software is authorized for installation.

24. A method of controlling access to software by a data processing system, comprising:

providing a copy of the software, the software being divided into a first encrypted portion and a second unencrypted portion, the second unencrypted portion having access to a first secret value and a software identification associated with the copy of the software and wherein the first encrypted portion is encrypted with a first key value which is based on the first secret value and a second secret value associated with the software identification of the copy of the software;

obtaining the second secret value;

generating the first key value from the obtained second secret value and the first secret value;

decrypting the first encrypted portion of the software utilizing the first key value;

generating the first key value based on the first and second secret values at the network server; and associating the first key value with the identification of the copy of the software as an updated second secret value to be provided in response to a subsequent request for the second secret value.

25. A method according to claim 24, further comprising the steps of:

copying the first encrypted portion of the software from a read only media to a writeable storage media;

generating a second key value from the first key value and the first secret value;

encrypting the decrypted first encrypted portion of the software with the second key value; and storing the first encrypted portion of the software encrypted with the second key value on the writeable storage media.

26. A method according to claim 25, further comprising the steps of:

maintaining a copy of the second secret value as an initial second secret value; and selectively providing the initial second secret value in response to a request for the second secret value.

27. A method according to claim 26, wherein the step of obtaining the second secret value comprises the steps of:

requesting the second secret value from a network server; and receiving the second secret value from the network server in response to the request for the second secret value.

28. A method according to claim 27, further comprising the steps of:

determining if the request for the second secret value is for an authorized installation of the copy of the software; and sending the second secret value only if the request is for an authorized installation of the copy of the software.

29. A method according to claim 28, further comprising the step of tracking the number of times that the copy of the software has been installed; and wherein the determination of whether the request is for an authorized installation comprises the step of determining if the number of times that the copy of the software has been installed exceeds a maximum number of times that the software is authorized for installation.

30. A method according to claim 29, further comprising the steps of:
    determining if the request for installation is a request to resynchronize secret values utilized to generate the first key value; and
    providing the initial second secret value if the request for installation is a request to resynchronize secret values.

31. A method according to claim 30, further comprising the step of tracking the number of times that the initial second secret value has been provided; and
    wherein the determination of whether the request is for an authorized installation further comprises the step of determining if the number of times that the second secret value has been provided exceeds a maximum number of times that the second secret value is authorized to be provided.

32. A method of controlling access to software by a data processing system, comprising:
    providing a copy of the software, the software being divided into a first encrypted portion and a second unencrypted portion, the second unencrypted portion having access to a first secret value and a software identification associated with the copy of the software and wherein the first encrypted portion is encrypted with a first key value which is based on the first secret value and a second secret value associated with the software identification of the copy of the software;
    obtaining the second secret value;
    generating the first key value from the obtained second secret value and the first secret value;
    decrypting the first encrypted portion of the software utilizing the first key value;
    encrypting the first encrypted portion of the software as a plurality of encrypted blocks;
    wherein the step of decrypting the first encrypted portion of the software comprises decrypting an encrypted block of the plurality of encrypted blocks with the first key value;
    wherein the step of encrypting the decrypted first encrypted portion of the software comprises encrypting the decrypted block with the second key value;
    wherein the step of storing the first encrypted portion of the software encrypted with the second key value comprises storing the block encrypted with the second key value; and
    wherein the block of the plurality of encrypted blocks is decrypted, encrypted and stored before a next block of the plurality of blocks is decrypted, encrypted and stored.

33. A method of controlling software installation by a data processing system, comprising:
    associating a software identification and first and second secret values with a copy of the software;
    receiving a request for installation of the software on a data processing system, wherein the request identifies the software identification of the copy of the software;
    determining the second secret value associated with the software identification;
    determining if the installation of the copy of the software to be installed is authorized;
    sending the second secret value to the data processing system if the installation of the copy of the software to be installed is authorized;
    generating a first key value from the first and second secret values associated with the copy of the software; and
    associating the first key value with the software identification of the copy of the software as an updated second secret value.

34. A method according to claim 33, wherein the determination of whether the installation of the copy of the software is authorized is based on at least one of the identification of the copy of the software, an identification of a user of the software, an identification of a processing system on which the software is to be installed, an authorized number of installations for the copy of the software and a number of previous installations of the copy of the software.

35. A method according to claim 33, wherein the step of associating the first key value with the software identification of the copy of the software as an updated second secret value comprises the step of replacing the second secret value associated with the software identification of the copy of the software with the first key value.

36. A system for controlling access to software by a data processing system, comprising:
    means for providing a copy of the software, the software being divided into a first encrypted portion and a second unencrypted portion, the second unencrypted portion having access to a first secret value and a software identification associated with the copy of the software and wherein the first encrypted portion is encrypted with a first key value which is based on the first secret value and a second secret value associated with the software identification of the copy of the software;
    means for obtaining the second secret value;
    means for generating the first key value from the obtained second secret value and the first secret value;
    means for decrypting the first encrypted portion of the software utilizing the first key value;
    means for generating a second key value from the first key value and the first secret value;
    means for encrypting the decrypted first encrypted portion of the software with the second key value; and
    means for storing the first encrypted portion of the software encrypted with the second key value.

37. A system for controlling software installation by a data processing system, comprising:
    means for associating a software identification and first and second secret values with a copy of the software;
    means for receiving a request for installation of the software on a data processing system, wherein the request identifies the software identification of the copy of the software;
    means for determining the second secret value associated with the software identification;
    means for determining if the installation of the copy of the software to be installed is authorized; and
    means for sending the second secret value to the data processing system if the installation of the copy of the software to be installed is authorized;
    means for generating a first key value from the first and second secret values associated with the copy of the software; and
    means for associating the first key value with the software identification of the copy of the software as an updated second secret value.

38. A computer program product for controlling access to software comprising:
- a computer readable storage media having computer readable program code embodied therein, the computer readable program code comprising:
- computer readable program code which provides a copy of the software, the software being divided into a first encrypted portion and a second unencrypted portion, the second unencrypted portion having access to a first secret value and a software identification associated with the copy of the software and wherein the first encrypted portion is encrypted with a first key value which is based on the first secret value and a second secret value associated with the software identification of the copy of the software;
- computer readable program code which obtains the second secret value;
- computer readable program code which generates the first key value from the obtained second secret value and the first secret value;
- computer readable program code which decrypts the first encrypted portion of the software utilizing the first key value;
- computer readable program code which generates a second key value from the first key value and the first secret value;
- computer readable program code which encrypts the decrypted first encrypted portion of the software with the second key value; and
- computer readable program code which stores the first encrypted portion of the software encrypted with the second key value.

39. A computer program product for controlling software installations, comprising:
- a computer readable storage media having computer readable program code embodied therein, the computer readable program code comprising:
- computer readable program code which associates a software identification and first and second secret values with a copy of the software;
- computer readable program code which receives a request for installation of the software on a data processing system, wherein the request identifies the software identification of the copy of the software;
- computer readable program code which determines the second secret value associated with the software identification;
- computer readable program code which determines if the installation of the copy of the software to be installed is authorized; and
- computer readable program code which sends the second secret value to the data processing system if the installation of the copy of the software to be installed is authorized;
- computer readable program code which generates a first key value from the first and second secret values associated with the copy of the software; and
- computer readable program code which associates the first key value with the software identification of the copy of the software as an updated second secret value.

* * * * *